May 3, 1949.　　　M. W. HUBER　　　2,468,980
PISTON SEALING STRUCTURE
Filed Aug. 2, 1944
Fig. 1
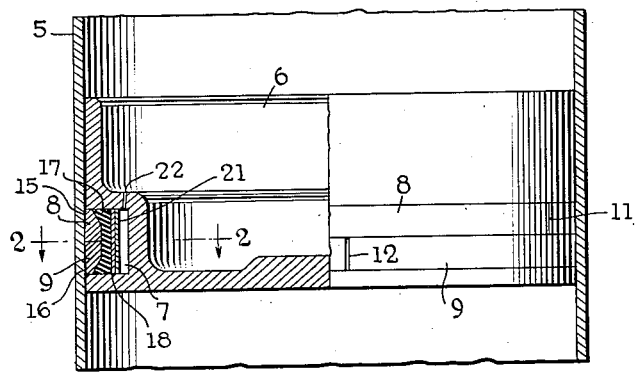
Fig. 2
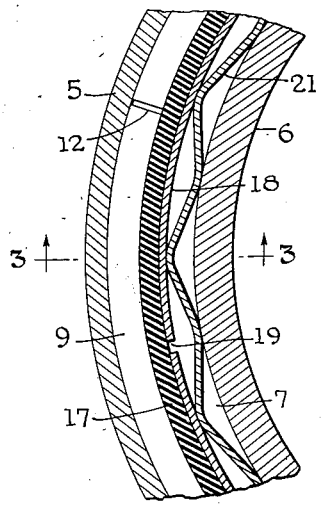
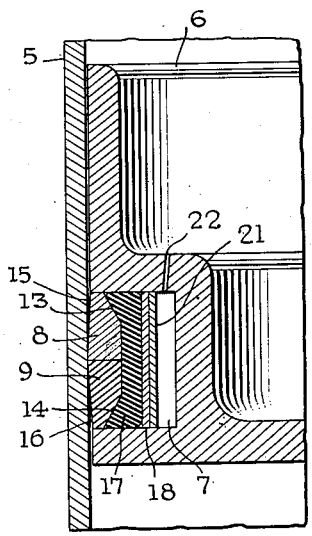
Fig. 3
Fig. 4
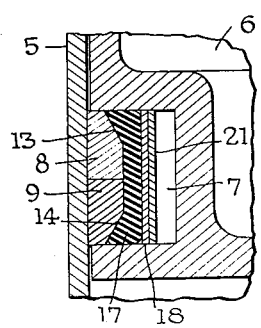
Inventor
Matthew W. Huber
By
Attorneys Patented May 3, 1949

2,468,980

UNITED STATES PATENT OFFICE 2,468,980

PISTON SEALING STRUCTURE

Matthew W. Huber, Watertown, N. Y., assignor to The New York Air Brake Company, a corporation of New Jersey Application August 2, 1944, Serial No. 547,797

3 Claims. (Cl. 309—44)

This invention relates to piston packing structures for use with fluids at temperatures which will not harmfully affect rubber or synthetic rubber substitutes.

One field of use is to seal the piston of hydraulic accumulators of the type in which a piston floats between the surface of the hydraulic liquid and a highly compressed gas cushion. So used the pressure differential across the piston is low, even though the liquid and the gas cushion are under high pressure (4,000 pounds per sq. in. being not uncommon). The invention may however be used to seal against leakage under substantial pressure differentials.

The actual seal is produced by at least two split metallic piston rings mounted side by side in the same groove. The backs of these two rings are sealed by a continuous rubber-like ring which is urged outward by expanding means, preferably of the spring type.

The invention will be described by reference to the accompanying drawings which show the seal as used in the accumulator forming the subject of my copending application Ser. No. 535,350, filed May 12, 1944, now Patent No. 2,417,873, dated March 25, 1947, of which the present application is in part a continuation.

In the drawing:

Figure 1 is an axial section through a portion of a cylinder with a floating piston equipped with the invention, shown part in axial section and part in elevation.

Figure 2 is an enlarged fragmentary section on the line 2—2 of Figure 1.

Figure 3 is a fragmentary section on the line 3—3 of Figure 2.

Figure 4 is a view similar to Figure 3 showing a modification.

Working in cylinder 5 is a cup-shaped piston 6 having a single rather wide ring groove 7. In this groove are assembled side by side two snap rings 8 and 9 formed of any suitable metal. Cast iron is extensively used for piston rings subject to high temperatures but where the temperatures are moderate there is a wider range of choice.

The rings 8 and 9 have each the usual gap 11 and 12 (see Fig. 1) and each ring has a bevel or chamfer 13 or 14 on its inner face. The rings are elastic and so curved as to have an expanding tendency such that they bear evenly around the circumference of the cylinder. The width of the gaps 11 and 12 is somewhat exaggerated in Figure 1.

As best shown in Figure 3 the rings 8 and 9 have a very slight bevel 15, 16 on the cylinder contacting or outer face of each ring. The bevel is exaggerated to make it visible. The bevel on the upper ring leads from the upper face and that on the lower ring from its lower face. The plane contacting surfaces of the rings 8 and 9 are lapped flat to ensure a precise fit of the rings with each other.

A soft resilient rubber-like ring 17 lies behind the rings 8 and 9, its outer face being molded to conform to the chamfered inner faces of the rings 8 and 9 so as to load them uniformly when the ring 17 is expanded. The ring 17 has no gap and may be of rubber or synthetic rubber-like plastic. Oil resisting qualities are desirable and commercial products having this characteristic are readily available.

Within ring 17 is a thin load distributing ring 18. This is of spring metal (usually steel), is co-extensive with the inner surface of ring 17, and has a gap 19 to permit expansion.

Within ring 18 is an ordinary zigzag expander 21. This is formed from a ribbon of spring metal (usually steel) and extends the full width of the ring groove.

A port 22 leads to groove 7 from one side of the piston, so that the sealing structure is urged outward by the fluid pressure sealed against. Thus the sealing effect of ring 17 is particularly important, for it prevents flow outward past either ring 8 or 9. Bevels 15, 16 assure that the ring structure is approximately balanced hydraulically, and the expansive tendency of the rings remains substantially constant. In this way a very free acting piston, that is absolutely oil tight, may be had.

The use of two adjacent rings in a single ring groove is known, but there is a decided advantage in the use of the rubber-like ring 17 because this will function to prevent any leakage through the groove behind the rings 8 and 9. The rubber-like ring 17 seals the rings 8 and 9 to each edge of the ring groove and to each other, and it has a wedging action on the rings which forces their lapped, close fitting faces toward each other.

The expander structure is conventional except for the presence of the pressure distributing split ring 18. While the expander mechanism as such is known, it is believed to be novel to have such an expander mechanism react upon a split metallic ring or a pair of such rings through a rubber-like sealing follower ring.

The port 22 may in certain cases be omitted. In the absence of port 22 the bevels 15, 16 are unnecessary and are omitted. A structure so modified is illustrated in Figure 4.

While two rings such as 8 and 9 are sufficient, the beneficial effect of the sealing ring 17 is present regardless of the number of rings in a single groove. A number of other variations of detail are possible. Consequently the drawings and description are intended to be illustrative of the general principle of the invention and do not imply necessary limits on the invention, the scope of which will be defined solely by the claims.

What is claimed is:

1. A piston ring assembly for mounting in the ring groove of a piston and comprising in combination at least two metallic snap rings assembled side by side to fill the width of the groove, the inner surfaces of rings which contact the sides of the groove being beveled toward the contacted side; a continuous rubber-like sealing ring underlying said rings, extending from side to side of the groove and having marginal portions which fit said bevels; and expanding means adapted to react outward upon substantially the entire inner surface of said sealing ring.

2. A piston ring assembly for mounting in the ring groove of a piston and comprising in combination at least two metallic snap rings assembled side by side to fill the width of the groove, the inner surfaces of rings which contact the sides of the groove being beveled toward the contacted side and the two relatively remote edges of the outer surfaces of the group of rings being slightly relieved; a rubber-like sealing ring underlying said rings, extending from side to side of the groove and having marginal portions which fit said bevels; and expanding means adapted to react outward upon substantially the entire inner surface of said sealing ring.

3. A piston ring assembly for mounting in the ring groove of a piston of the type having a pressure conducting port leading to the groove from one side of the piston and comprising in combination at least two metallic snap rings assembled side by side to fill the width of the groove, the inner surfaces of rings which contact the sides of the groove being beveled toward the contacted side and the two relatively remote edges of the outer surfaces of the group of rings being slightly relieved; a rubber-like sealing ring underlying said rings, extending from side to side of the groove and having marginal portions which fit said bevels; and expanding means adapted to react outward upon substantially the entire inner surface of said sealing ring.

MATTHEW W. HUBER.

REFERENCES CITED

The following references are of record in the file of this patent:

UNITED STATES PATENTS

| Number | Name | Date |
| --- | --- | --- |
| 120,565 | Blake | Nov. 7, 1871 |
| 246,712 | Booth | Sept. 6, 1881 |
| 519,314 | Williams | May 8, 1894 |
| 1,239,726 | Sauer et al. | Sept. 11, 1917 |
| 1,301,438 | Higley | Apr. 22, 1919 |
| 1,385,508 | Trembley | July 26, 1921 |
| 2,125,766 | Carlisle | Aug. 2, 1938 |

FOREIGN PATENTS

| Number | Country | Date |
| --- | --- | --- |
| 47 | Great Britain | Jan. 6, 1870 |
| 522,024 | Great Britain | June 6, 1940 |